(12) United States Patent
Moffett

(10) Patent No.: US 12,245,578 B2
(45) Date of Patent: Mar. 11, 2025

(54) FISHING LURE CONTAINER

(71) Applicants: Paul M. Moffett, Concordia, KS (US); Diane M. Moffett, Concordia, KS (US)

(72) Inventor: Paul M. Moffett, Concordia, KS (US)

( * ) Notice: Subject to any disclaimer, the term of this patent is extended or adjusted under 35 U.S.C. 154(b) by 309 days.

(21) Appl. No.: 17/553,039

(22) Filed: Dec. 16, 2021

(65) Prior Publication Data

US 2022/0104473 A1    Apr. 7, 2022

Related U.S. Application Data

(63) Continuation-in-part of application No. 16/032,964, filed on Jul. 11, 2018, now abandoned.

(51) Int. Cl.
*A01K 97/06*   (2006.01)

(52) U.S. Cl.
CPC ..................... *A01K 97/06* (2013.01)

(58) Field of Classification Search
CPC .................. A01K 97/00; A01K 97/06
See application file for complete search history.

(56) References Cited

U.S. PATENT DOCUMENTS

| | | | | |
|---|---|---|---|---|
| 2,670,563 A | * | 3/1954 | Anderson | A01K 97/06 206/315.11 |
| 2,675,640 A | * | 4/1954 | Adamek | A01K 97/06 206/315.11 |
| 2,693,662 A | * | 11/1954 | Norton | A01K 97/06 43/57.1 |
| 2,702,442 A | * | 2/1955 | Wallen | A01K 97/06 43/57.1 |
| 2,717,470 A | * | 9/1955 | Holdeman | A01K 97/06 206/315.11 |
| 2,814,152 A | | 11/1957 | Trujillo | |
| 2,927,395 A | | 6/1960 | Bartlett | |
| 3,022,600 A | * | 2/1962 | Glascoff | A01K 97/06 43/57.1 |
| 3,057,464 A | * | 10/1962 | Baggott, Sr. | A01K 97/06 206/820 |
| 3,378,134 A | * | 4/1968 | Wilkinson | A01K 97/06 206/315.11 |
| 4,200,249 A | * | 4/1980 | Synstelien | B65H 75/16 D8/358 |
| 4,366,641 A | | 1/1983 | Price | |
| 4,381,059 A | * | 4/1983 | Schurman | A61J 7/04 206/533 |
| 4,563,834 A | * | 1/1986 | Spencer | A01K 97/06 43/57.1 |

(Continued)

*Primary Examiner* — Peter M Poon
*Assistant Examiner* — Marisa V Conlon
(74) *Attorney, Agent, or Firm* — Kenneth H. Jack; Davis & Jack, LLC

(57) ABSTRACT

A fishing lure container incorporating a case having axial and oppositely axial ends; axial and oppositely axial walls fixedly attached to the case, wherein such walls are respectively positioned for closing the case's axial and oppositely axial ends; axial and oppositely axial ports respectively opening the case at the axial and the oppositely axial walls; axial and oppositely axial caps respectively covering the axial and oppositely axial ports, the axial and oppositely axial caps being rotatable; a lure frame having axial and oppositely axial ends, wherein such frame's axial end is fixedly attached to the axial cap; and a quick disconnect fastener interconnecting the lure frame's oppositely axial end and the oppositely axial cap.

12 Claims, 7 Drawing Sheets

(56) References Cited

U.S. PATENT DOCUMENTS

| | | | | |
|---|---|---|---|---|
| 4,813,173 | A | | 3/1989 | Abbotoy |
| 4,999,943 | A | * | 3/1991 | Crabtree ................ A01K 97/06 43/57.1 |
| 5,025,588 | A | | 6/1991 | Echols |
| 5,289,940 | A | | 3/1994 | Wisenbaugh |
| 5,297,676 | A | * | 3/1994 | Coleman ................ A01K 97/06 206/315.11 |
| 5,475,943 | A | | 12/1995 | Hodges |
| 5,533,297 | A | | 7/1996 | Crosby |
| 5,542,206 | A | | 8/1996 | Lisch |
| 5,606,820 | A | | 3/1997 | Suddeth |
| 5,799,787 | A | * | 9/1998 | Talbot .................... A01K 97/06 220/4.27 |
| 5,934,010 | A | | 8/1999 | Blackburn |
| 6,134,825 | A | * | 10/2000 | Moffett ................. A01K 97/06 206/315.11 |
| 7,627,980 | B2 | * | 12/2009 | Rathsack ............... A01K 97/06 43/57.1 |
| 11,825,826 | B1 | * | 11/2023 | Bradford ................ A01K 97/08 |
| 2005/0001085 | A1 | * | 1/2005 | Kimura ............. B65H 75/2272 242/227 |

* cited by examiner

FISHING LURE CONTAINER

CONTINUATION IN PART STATUS OF APPLICATION

Reference is made to U.S. patent application Ser. No. 16/032,964 entitled "Fishing Lure Container" and filed Jul. 11, 2018. The instant application constitutes a continuation in part of said '964 application. The specification and drawings of the instant application and those of said '964 application are substantially identical, with no new structures or functions of structures being introduced in the instant application. The inventor of and applicant of said '964 application and the instant application are the same, and the instant application is filed prior to any issuance under or abandonment of said '964 application. The benefit of and priority from said '964 application is hereby claimed to the extent of said application's disclosure.

FIELD OF THE INVENTION

This invention relates to fishing tackle boxes and containers. More particularly, this invention relates to such boxes and containers which are specially adapted for storing, displaying, and dispensing fishing lures.

BACKGROUND OF THE INVENTION

Commonly known and commonly configured fishing lure containers include mechanical features which give rise to problems and difficulties in receiving fishing lures for storage, in arranging such lures in an organized fashion during storage, in displaying the lures for subsequent selection, and in dispensing the lures for use.

The instant inventive fishing lure container solves or ameliorates such problems and difficulties by providing a specially adapted carousel type fishing lure container which includes a rotary fishing lure frame component, and by specially adapting the frame component for alternative utilization as a tabletop fishing lure stand.

BRIEF SUMMARY OF THE INVENTION

A first structural component of the instant inventive fishing lure container comprises a case component which has axial and oppositely axial ends. In a preferred embodiment, the case component is cylindrically configured, including an arcuately curved cylindrical wall.

Further structural components of the instant inventive fishing lure container comprise axial and oppositely axial end walls which are respectively fixedly attached to the axial and oppositely axial ends of the container's case component. In the preferred embodiment, the axial wall component covers and partially closes the otherwise open axial end of the case. The oppositely axial wall similarly covers and partially closes the case's oppositely axial end.

Further structural components of the inventive container comprise axial and oppositely axial ports which respectively open the case at its axial and oppositely axial ends, such ports preferably being formed wholly with and extending axially through the axial and oppositely axial wall components. In the preferred embodiment, the axial and oppositely axial walls are substantially circular, and the axial and oppositely axial ports are concentrically positioned thereon.

Further structural components of the instant inventive container comprise axial and oppositely axial end caps which are respectively positioned or positionable for covering the axial and oppositely axial ports. In the preferred embodiment, the axial and oppositely axial end caps include rotary bearing surfaces which, upon their respective contacts with the axial and oppositely axial walls, facilitate manual rotations and counter-rotations of such caps with respect to the case and end walls combination.

A further structural component of the instant inventive container comprises a lure frame which has axial and oppositely axial ends. In the preferred embodiment, the axial end of the lure frame is rigidly and permanently attached to an inner surface of the axial cap. Preferably, the lure frame comprises a central rigid axle column in combination with a sleeve member which is axially oblongated and radially overlies and surrounds such column. In the preferred embodiment, the sleeve component of the lure frame includes sponge rubber, elastomeric foam, cork or other materials which may easily receive the points of fishing lures for attaching and suspending the lures upon the lure frame.

A further structural component of the instant inventive fishing lure container comprises a quick disconnect fastener which is adapted for removably interconnecting the lure frame's oppositely axial end and the oppositely axial cap. In a preferred embodiment, the quick disconnect fastener is of the type which may be disengaged via fingertip pressure applied at an exterior surface of the oppositely axial cap. In operation of the inventive container, fingertip pressure actuated releases or disengagements of the quick disconnect fastener separate the lure frame from the oppositely axial cap, and allow the lure frame and attached axial cap to be axially withdrawn from the case. The invention's lure frame withdrawal function facilitates easy and convenient loading and off-loading of lures onto and from the lure frame. Other quick disconnect fasteners such as screw connectors and pressure fitted joints may be suitably substituted.

In use of the instant inventive fishing lure container, and assuming provisions of preferred components described above, a fisherman may initially separately utilize the permanently interconnected axial cap and fishing lure frame combination while it is detached and removed from the case. The axial cap's preferred flat axial surface allows the fisherman to orient the axial cap and lure frame so that the cap rests upon a flat tabletop surface in the manner of a column stand or base with the lure frame extending upwardly from the tabletop. Upon such placement and orientation, the fisherman may conveniently attach a selection of fishing lures to the frame's sponge rubber sheath. In a preferred mode of use of the invention, such lure attachments entail lancing of points of lure hooks into the sheath.

Following attachments of a desired selection of fishing lures to the frame's lure holding sheath, the fisherman may oppositely axially extend the frame and attached fishing lures through the oppositely axial port. Such extension preferably continues until the oppositely axial end of the frame protrudes through the oppositely axial port for engagement with the quick disconnect fastener. Provided that the quick disconnect fastener component comprises fastener halves residing at the oppositely axial cap and at the oppositely axial end of the lure frame, such fastener may become engaged via placement or positioning of the oppositely axial cap over the oppositely axial port.

The above described engagement of the quick disconnect fastener securely captures the lure frame and its attached lures within the case's interior space while facilitating rotation of the lure frame and attached lures about the case's rotation axis.

Preferably, the inventive container comprises a door assembly including a doorway or lure dispensing port within the case, and including an arcuately curved pocket door which is slidably received by slide channels formed within the axial and oppositely axial walls. Opening of such pocket door exposes the lure frame and attached lures within the case. Rotations of the lure frame effected via manual turning of the axial cap rotates the lure frame within the case and successively exposes various attached lures within the doorway for selection and extraction.

Upon completion of fishing, the fisherman may easily and conveniently manipulate the quick disconnect fastener to release the lure frame from the oppositely axial cap. Thereafter, the lure frame and attached lures may be axially extracted for easy and convenient removal and separate storage of all attached lures.

Accordingly, objects of the instant invention include the provision of a fishing lure container which incorporates structures as described above, and which arranges those structures in relation to each other in manners described above for the achievement and performance of beneficial functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
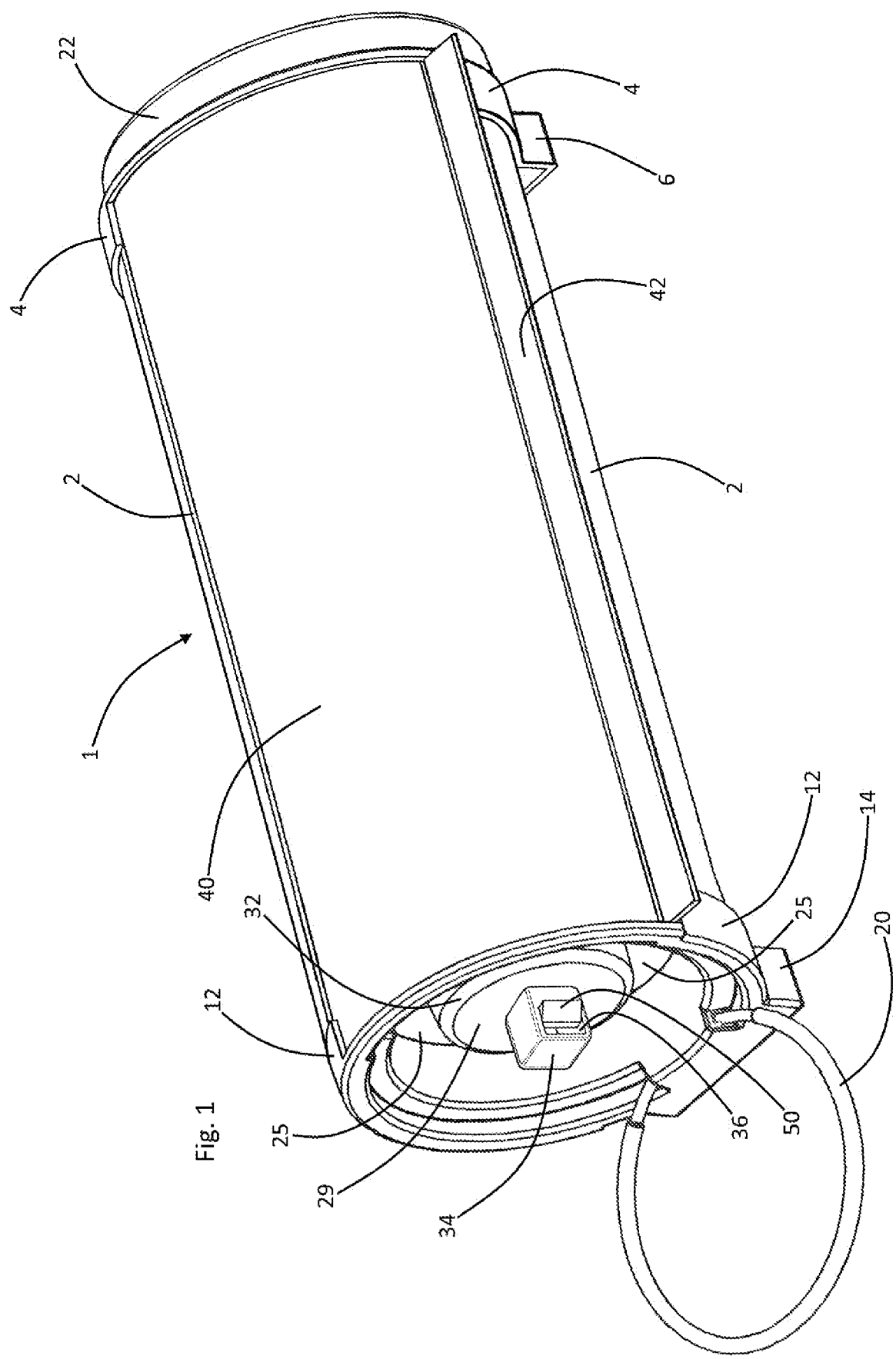
FIG. 1 is a perspective view of the instant inventive fishing lure container.

Referring now to the drawings, and in particular to Drawing FIG. 1, a preferred embodiment of the instant inventive fishing lure container is referred to generally by Reference Arrow 1. The fishing lure container 1 comprises a cylindrical case 2 which is preferably composed of rigid and durable plastic. In a preferred embodiment, the case 2 is opened by a doorway or lure dispensing port 3 which comprises an approximate 90° interruption of the preferred circumferential extension of the case 2.

Figure 6:
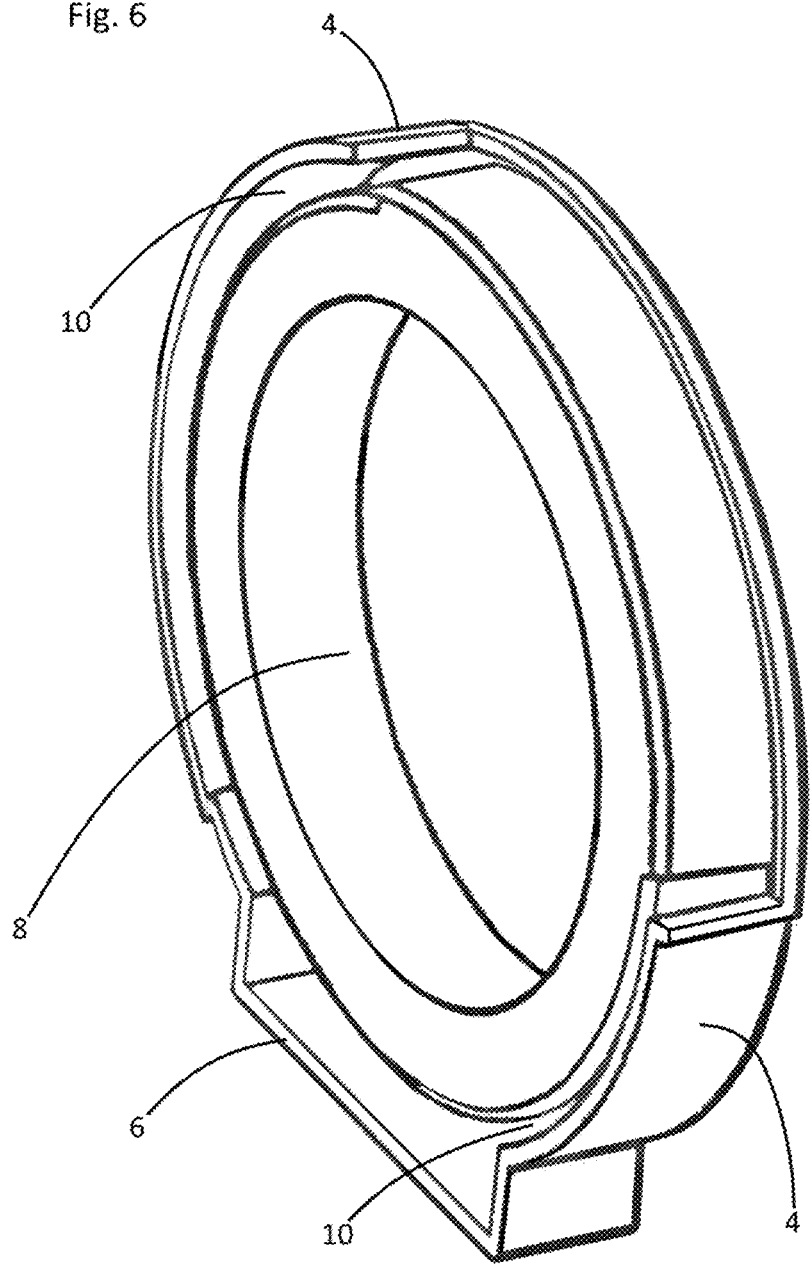
FIG. 6 is a perspective view of a separated oppositely axial wall component of the FIG. 1 structure.

Referring further simultaneously to FIG. 6, a further structural component of the instant inventive container comprises an axial wall 4 which is fixedly attached (suitably by an adhesive) to the axial end of the case 2, the axial wall 4 partially closing the case 2 at its axial end. In the preferred embodiment, the axial wall 4 forms and defines an axial port 8, and forms and defines a circumferentially extending pocket door slide channel 10. The axial wall 4 preferably is composed of durable plastic, and has a flat base extension 6.

Figure 2:
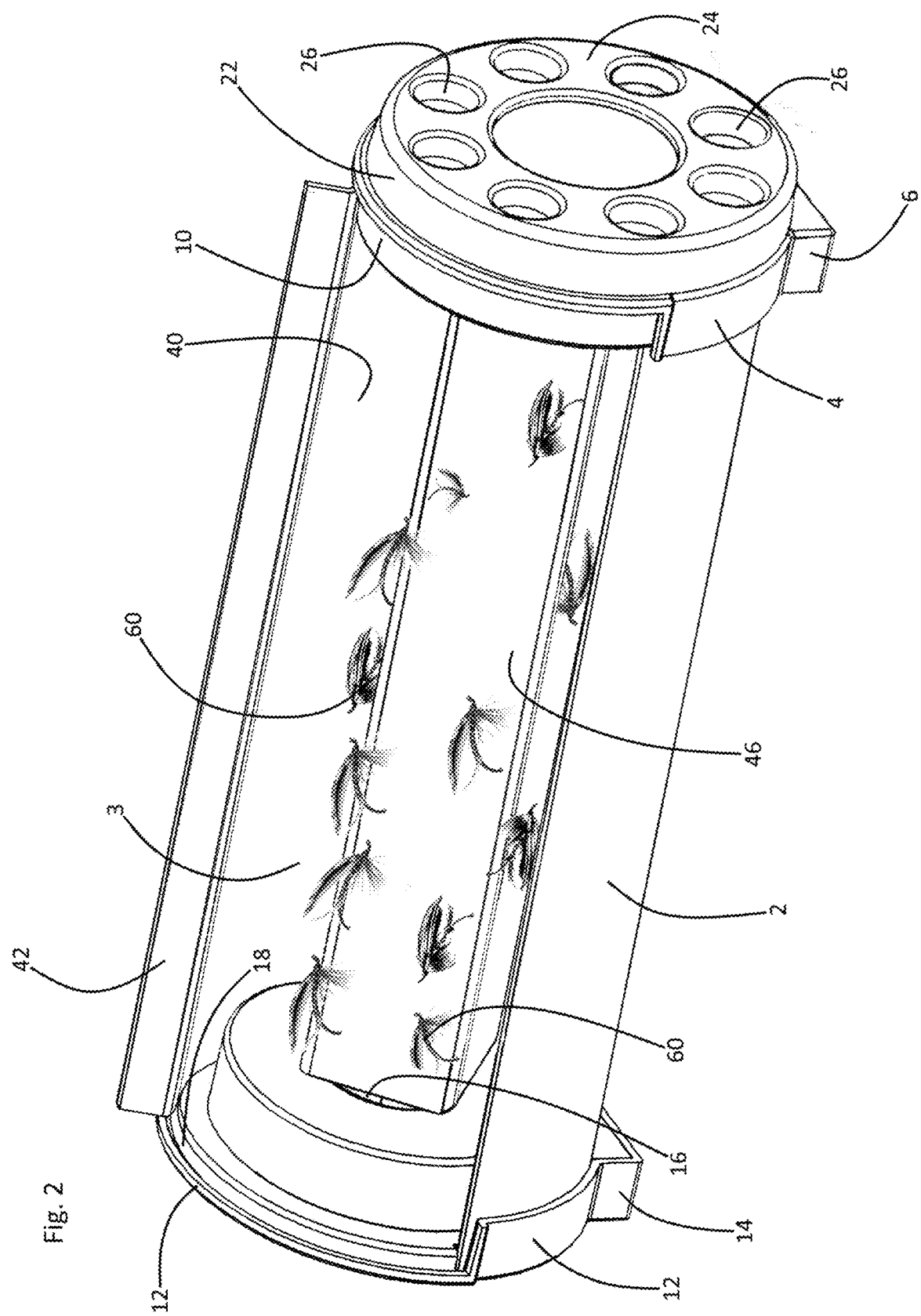
FIG. 2 is an alternative perspective view of the container of FIG. 1, the view of FIG. 2 showing a pocket door component in an opened position.
Figure 3:
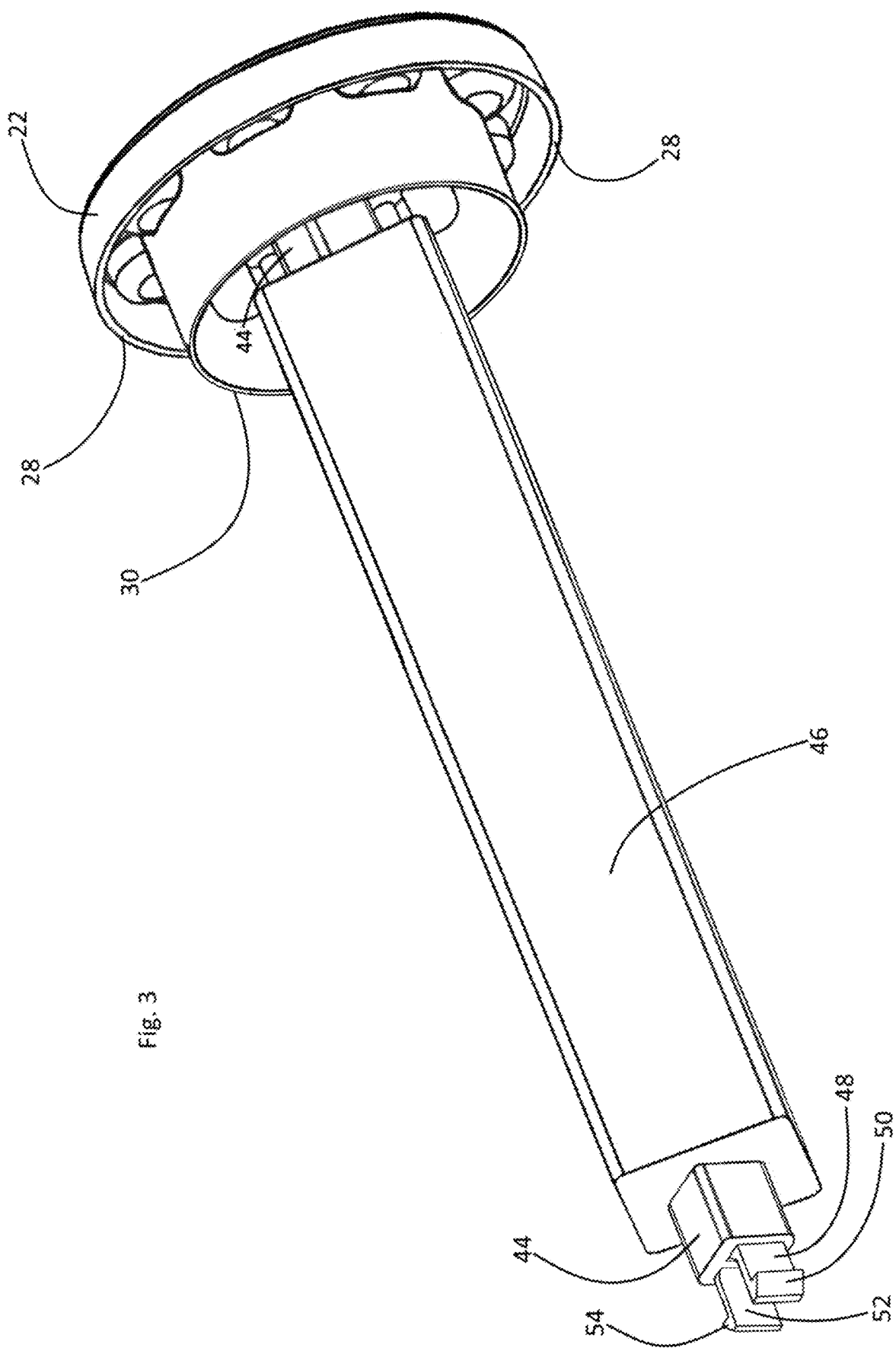
FIG. 3 is a perspective view of a separated lure frame and end cap combination component.

The inventive container preferably further comprises and oppositely axial wall 12 which is configured and attached similarly with the axial wall 4. Wall 12 is opened by an oppositely axial port 16. The oppositely axial port 16 is best seen in FIG. 2 which shows a portion of the axial end or axial opening of the oppositely axial port 16. Referring further to FIG. 1, it may be seen that an oppositely axial cap 32 covers and closes the oppositely axial end of or opening of the oppositely axial port 16. While the oppositely axial end of the oppositely axial port 16 is not exposed to view in the drawings, the shape, size, and position of such oppositely axial port end may be understood by reference to the rotary bearing functioning sleeve 38 which extends axially from the axial end of the oppositely axial cap 32. Said sleeve 38 is nestingly axially received within the oppositely axial end of the oppositely axial port 16. The oppositely axial wall 12 presents an axially recessed wall or surface 25, and the oppositely axial port 16 opens oppositely axially at said surface 25.

In addition to its presentation of the oppositely axial port 16, the oppositely axial wall 12 forms an oppositely axial pocket door channel 18. A flat base extension 14 of the wall 12 functions in conjunction with extension 6 to allow the container 1 to conveniently rest upon a tabletop surface.

An axial cap 22 is preferably provided, such cap being positioned at the axial end of the container 1 for closing and covering the axial port 8. In a preferred embodiment, the axial cap 22 has a concentric guide sleeve 30 whose outside diameter is closely fitted to the inside diameter of the axial port 8. Upon an oppositely axial insertion of sleeve 30 into and through port 8, an annular bearing surface 28 of the cap 22 may abut the axial end of the axial wall 4. Accordingly, sleeve 30 together with annular surface 28 functions as a rotary bearing which allows the cap 22 to be manually turned and counter-turned with respect to the axial wall 4 and the case 2. A radial array of axially opening fingertip receiving sockets 26 is preferably formed within the cap 22 for ergonomically facilitating such manual rotation.

Figure 4:
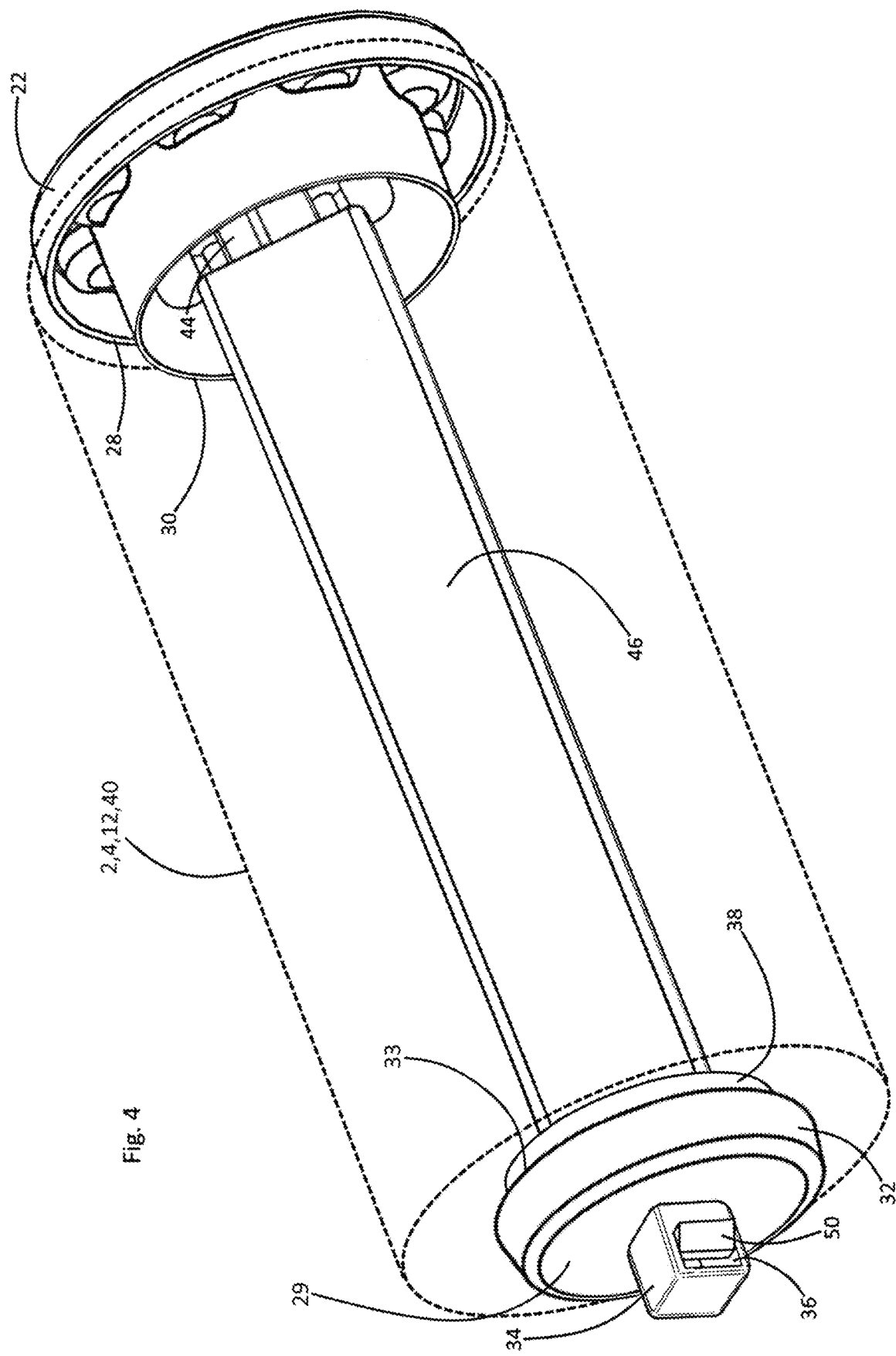
FIG. 4 redepicts the structure of FIG. 3, the view of FIG. 4 showing an attachment of an oppositely axial cap component, and representationally showing other case components in dashed lines.

Referring to FIGS. 2 and 4, the oppositely axial cap 32 integrally forms and presents the rotary bearing functioning sleeve 38 which is fitted for the axial extension into the oppositely axial end of the oppositely axial port 16. Referring simultaneously to FIGS. 1, 2, and 4, it may be seen that the oppositely axial end of the oppositely axial cap 32 forms a substantially circular oppositely axially facing surface or ceiling which is designated by the lead line extending from Reference Numeral 29. The cap 32 includes an annular flange which extends axially from the annular peripheral edge of said ceiling or surface 29, and the terminal end of the lead line drawn in FIG. 4 which extends from Reference Numeral 32 identifies both the cap 32 and such cap's axially extending flange. The annular axial end of such flange 32 forms and serves as a rotary bearing surface 33 which bears against and rotatably slides over the oppositely axial surface 25 of the wall 12.

A further structural component of the instant inventive container 1 comprises a lure frame which has axial and oppositely axial ends. In a preferred embodiment, the lure frame includes a rigid plastic column 44 whose axial end is fixedly and rigidly attached to the interior of the axial cap 22. In the preferred embodiment, the lure frame component further comprises an axially oblongated lure hook engaging member 46, such member preferably comprising a sponge rubber sleeve which is slidably mounted over the column 44. The column 44 and sleeve 46 combination is intended as being representative of other rotatable structures which are mechanically capable of holding fishing lures within the interior 3 of the case 2. Rotations and counter-rotations of the axial cap 22 with respect to the axial wall 4 and with respect to the case 2 co-rotates or simultaneously rotates the lure frame component 44,46.

A further structural component of the inventive container 1 comprises a quick disconnect fastener having fastener halves which are operatively connected to the oppositely axial cap 32, and to the oppositely axial end of the lure frame 44,46. In a preferred embodiment, the quick disconnect fastener comprises at least a first spring hook 48 having an axial end fixedly attached to or formed wholly with the oppositely axial end of the axial column component 44, and having a hook configured oppositely axial end 50. Such at least first spring hook 48,50 comprises a fastener half, the other half of the fastener suitably comprising a socket extension 34 of the oppositely axial cap 32. As seen in FIGS. 1 and 4, the socket extension 34 has an oppositely axial end which faces toward the viewer of FIGS. 1 and 4, and has an axial end which is relatively positioned at the longitudinally opposite end of the socket extension 34, such positioning being away from the viewer. The axial end of the socket extension 34 is fixedly attached to or formed wholly with the ceiling portion 29 of the oppositely axial cap 32.

The socket extension 34 preferably presents at least a first release port 36 whose axial threshold functions as a hook engaging edge or ledge for latching contact with the hook end 50 of the spring hook 48. If the socket extension 34 were to extend in the axial direction from ceiling 29, the release port 36 would become undesirably positioned at or within the axial interior of the cap 32. Such positioning would undesirably cause the cap itself to obstruct any attempt at fingertip access of the port 36. Accordingly, as is depicted in FIGS. 1 and 4, the socket extension 34 is advantageously positioned oppositely axially from, and advantageously extends oppositely axially from the cap 32. Such positioning and direction of extension assures easy fingertip access to the release port 36 by causing the release port 36 to reside at the user access side (i.e., the oppositely axial side) of the ceiling 29 of the cap 32.

The quick disconnect fastener component of the instant invention preferably further comprises a second radially oppositely positioned spring hook 52 which similarly has an oppositely axial hook end 54. Similarly with hook end 50, hook end 54 releasably latches within a second release port formed at the radially opposite side of the socket 34 (such second release port not being within view but being configured similarly with the at least first release port 36). The depicted quick disconnect fastener 34,36,48,50,52,54 is intended as being representative of other suitably substituted quick disconnect fasteners such as screw connectors and pressure fitted joints.

An oppositely axial extension of the lure frame 44,46 through port 8 allows the spring hooks 48,50 and 52,54 to simultaneously enter port 16, and enter the annular inner periphery of sleeve 38. Continued oppositely axial extension of the spring hooks allows them to enter the interior of socket 34, causing hook ends 50 and 54 to snap radially outwardly within the release ports 36, such hooks latching against the hook edges which are present at the axial thresholds of the release ports. Such latching engagements of the spring hooks 48,50 and 52,54 within socket 36 securely hold the cap 32 at its port covering position over the oppositely axial wall 12 and simultaneously holds the hook frame 44,46 within the interior space 3 of the container 1 and holds cap 22 at its axial port covering position.

An arcuately curved pocket door 40 having a finger engageable stop flange 42 is preferably operatively attached to the container 1, such door having its axial and oppositely axial ends slidably received within pocket door channels 10 and 18.

A carry handle 20 may be provided, such handle 20 preferably being pivotally attached for movement between the depicted oppositely axially extended use position and a compact and unobtrusive nesting position upon a recessed circumferential land formed within the oppositely axial end of wall 12.

In use of the instant inventive container, and assuming an initial configuration as indicated in FIG. 1, a fisherman may place the tips of his thumb and index finger over the release ports 36 of the quick disconnect fastener socket 34. Thereafter, the fisherman may depress hook ends 50 and 52 radially inwardly and toward each other, allowing such hook ends to disengage from the axial thresholds of the release ports 36. While the hook ends 50 and 54 remain inwardly depressed, the fisherman may utilize his other hand to pull the axial cap 22 in the axial direction, such pulling force drawing the axial cap 22 and the attached fishing lure frame 44,46 out of and away from the case 2.

Figure 5:
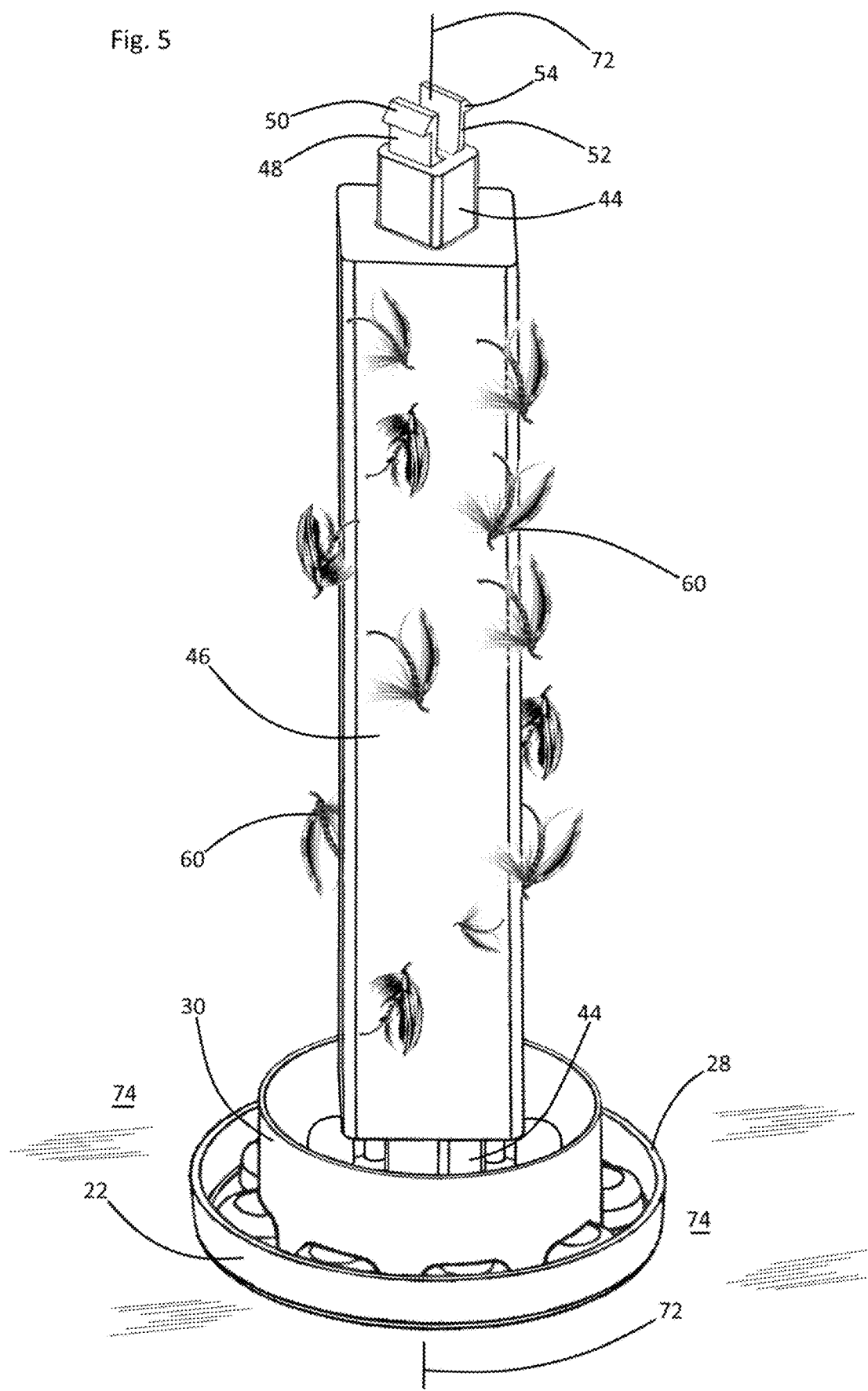
FIG. 5 redepicts the cap and frame combination of FIG. 3, the view of FIG. 5 showing such combination in use in a tabletop stand configuration.

Thereafter, referring to FIG. 5, the fisherman may tilt the fishing lure frame 44,46 upward, and may place the flat axial surface 24 of the axial cap 22 upon another flat surface, such as a tabletop 74. In the preferred embodiment, such cap 22 and fishing lure frame 44,46 combination has a rotation axis 72 which is substantially perpendicular to the axial surface 24 of cap 22. Such perpendicular orientation advantageously allows the lure frame 44,46 to extend substantially perpendicularly upwardly from such flat table surface 74. In the FIG. 5 configuration and mode of use, the cap 22 and lure frame 44,46 combination conveniently functions as a lure receiving and organizing stand. In such configuration, a selection of fishing lures 60 may be inserted into and arranged upon the various faces of the sponge rubber sleeve 46 as depicted.

Following attachments of the selected fishing lures 60 to the frame 44,46, the fisherman may re-extend the frame 44,46 through port 8 until hook arms 48,50 and 52,54 enter the quick disconnect fastener socket 34. Upon complete entry of such hook arms into such socket, hook ends 50 and 54 snap in a latching fashion into place within release ports 36, securely holding the hook frame 44,46 within the case 2. Thereafter, manually imposed rotations and counter-rotations of the axial cap 22 may variously display the lures 60 within the lure dispensing port 3.

Figure 7:
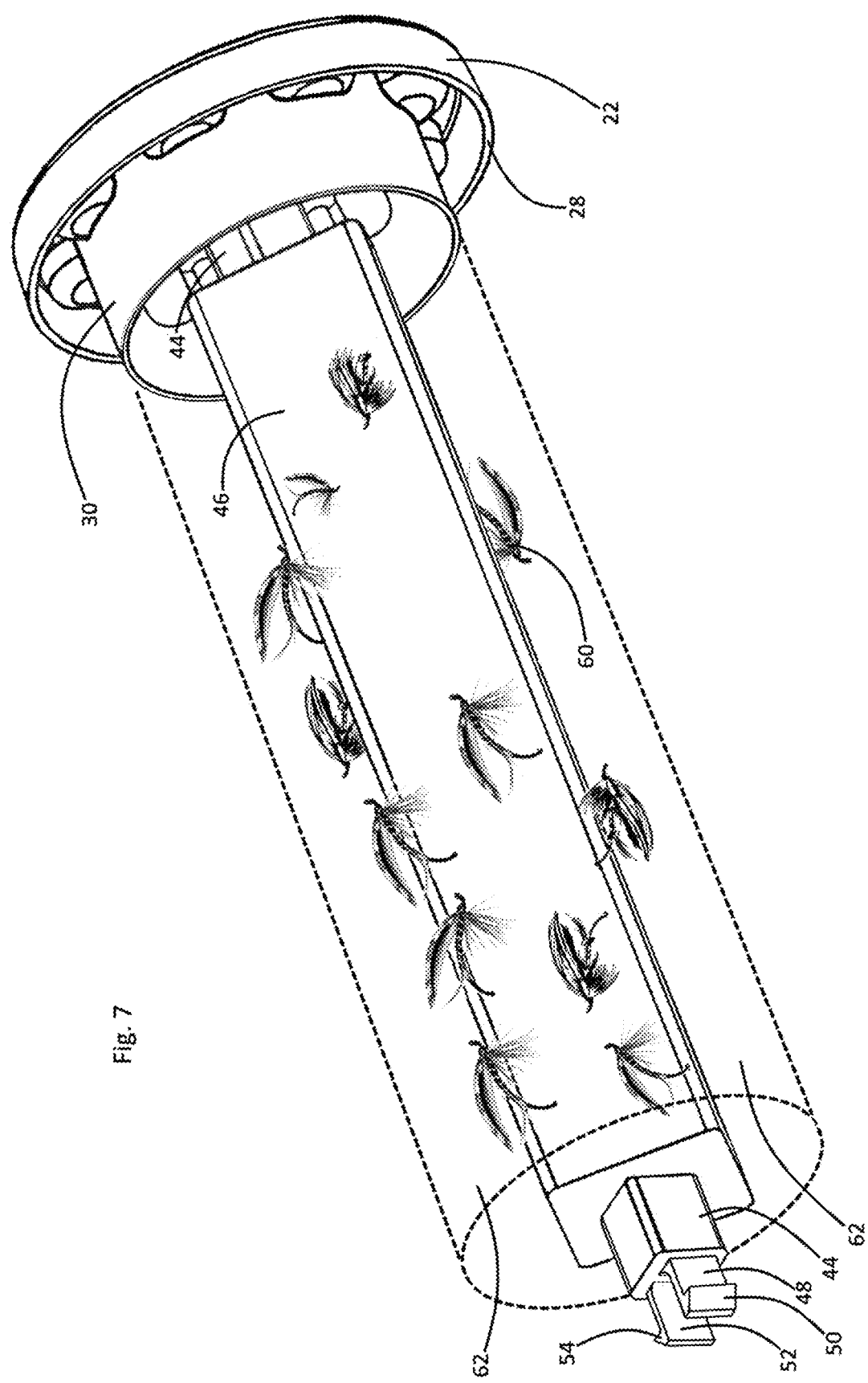
FIG. 7 redepicts the structure of FIG. 5, the view of FIG. 7 showing in dashed lines an insertion annulus component.

As shown in FIG. 7, an insertion annulus 62 is drawn in dashed lines, such annulus having a diameter substantially equal to the diameter of bearing sleeve 30. The instant invention's provision of such insertion annulus 62 advantageously assures that, upon insertion of the lure frame 44,46 into and through the axial port 8, the attached lures 60 will not impinge against or interfere with the peripheral surfaces of the axial wall 4.

Following utilization of the fishing lure container 1 during fishing, a reversal of steps described above allows for easy and convenient detachment of all lures 60 for separate non-fishing storage.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A fishing lure container comprising:
   (a) a case having axial and oppositely axial ends;
   (b) an axial ring-like circumferential wall fixedly attached to the case at the case's axial end;
   (c) an oppositely axial ring-like circumferential wall fixedly attached to the case at the case's oppositely axial end;
   (d) axial and oppositely axial ports respectively defined by the axial and oppositely axial ring-like circumferential walls;
   (e) axial and oppositely axial caps closing the axial and oppositely axial ports, wherein each cap among the axial and oppositely axial caps is rotatable, wherein the axial cap comprises a guide sleeve extending oppositely axially into the axial port, and wherein the oppositely axial cap has an oppositely axial end;
   (f) a lure frame having axial and oppositely axial ends, the lure frame's axial end being rigidly attached to the axial cap;
   (g) a quick disconnect fastener comprising a socket;
   (h) at least a first release port opening the socket; and
   (i) at least a first spring hook, wherein the quick disconnect fastener's socket extends oppositely axially from the oppositely axial end of the oppositely axial cap, wherein the quick disconnect fastener's socket positions the at least first release port oppositely axially from the oppositely axial end of the oppositely axial cap, wherein the at least first spring hook is adapted to engage the at least first release port, wherein the quick disconnect fastener's socket has an axial end, and wherein the axial end of the quick disconnect fastener's socket is positioned at the oppositely axial end of the oppositely axial cap.

2. The fishing lure container of claim 1 wherein the case comprises a cylindrical wall, and further comprising a lure dispensing port, the lure dispensing port further opening the case at the cylindrical wall.

3. The fishing lure container of claim 2 wherein the lure frame comprises an axially oblongated hook engaging member, the axially oblongated hook engaging member co-rotating with the axial cap.

4. The fishing lure container of claim 3 further comprising a door assembly connected operatively to the case for alternatively closing and opening the lure dispensing port.

5. The fishing lure container of claim 4 wherein the door assembly comprises an arcuately curved pocket door.

6. The fishing lure container of claim 2 wherein the at least first spring hook has axial and oppositely axial ends, and wherein the at least first spring hook's axial end is fixedly attached to the lure frame's oppositely axial end.

7. The fishing lure container of claim 6 wherein the at least first release port comprises at least a first hook edge, wherein the at least first hook edge is positioned for, upon an oppositely axial extension of the lure frame toward the oppositely axial cap, engaging the at least first spring hook's oppositely axial end.

8. The fishing lure container of claim 7 wherein the at least first release port is positioned at the oppositely axial cap so that, upon the at least first hook edge's engagement of the at least first spring hook, fingertip pressure may be extended therethrough for disengaging said spring hook.

9. The fishing lure container of claim 8 further comprising a second spring hook, a second hook edge, and a second release port respectively positioned radially oppositely from the at least first spring hook, the at least first hook edge, and the at least first release port.

10. The fishing lure container of claim 1 wherein the axial port has a diameter, and further comprising an insertion annulus radially overlying the lure frame, the insertion annulus having a diameter less than that of the axial port.

11. The fishing lure container of claim 10 wherein the axial cap has an axial surface, and further comprising a radial array of fingertip sockets, each socket among the radial array of fingertip sockets opening axially at said axial surface.

12. The fishing lure container of claim 11 wherein the lure frame has a rotation axis, and wherein the axial cap's axial surface comprises a substantially perpendicular lure stand surface.

* * * * *